(No Model.)
H. P. COPE.
DEVICE FOR OPERATING SECTIONAL BLOWERS.
No. 345,574. Patented July 13, 1886.
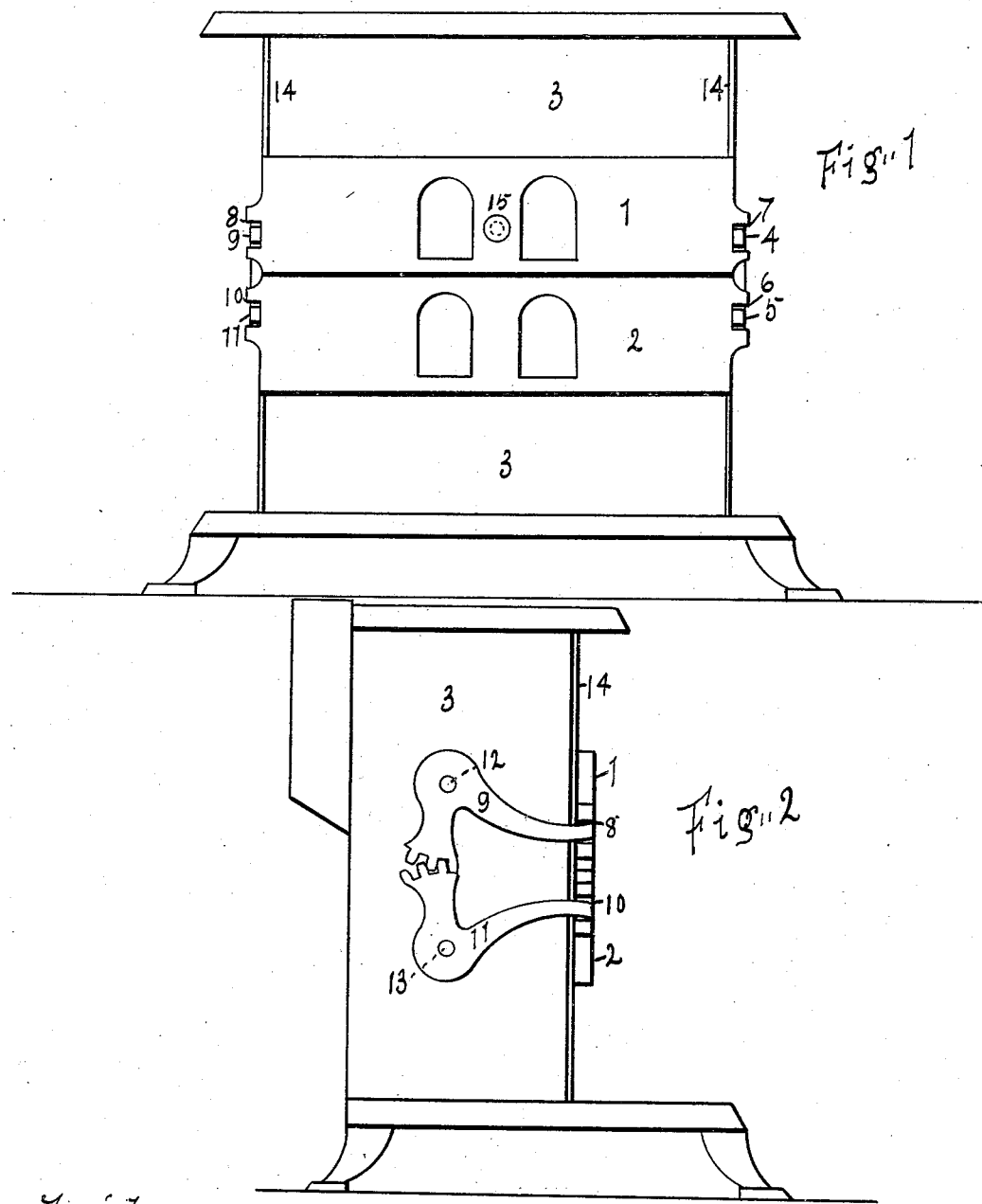

UNITED STATES PATENT OFFICE.

HENRY P. COPE, OF DETROIT, MICHIGAN, ASSIGNOR TO THE DETROIT STOVE WORKS, OF SAME PLACE.

DEVICE FOR OPERATING SECTIONAL BLOWERS.

SPECIFICATION forming part of Letters Patent No. 345,574, dated July 13, 1886.

Application filed January 25, 1886. Serial No. 189,659. (No model.)

*To all whom it may concern:*

Be it known that I, HENRY P. COPE, of Detroit, in the county of Wayne and State of Michigan, have invented a new and useful Improvement in Devices for Operating Sectional Blowers, of which the following is a specification.

My invention consists in an improved device for operating sectional blowers for open-front stoves and fire-places, hereinafter fully pointed out and described.

Figure 1 is a front elevation, and Fig. 2 a side elevation with the side plate removed, of a stove containing my invention.

3 represents an open-front stove, and 1 and 2 represent blowers, each of which is of sufficient width to cover somewhat more than half the opening in the stove-front, and extending across the front of the stove. Blower 1 has at each end two projecting lugs, 7 and 8, leaving a groove between them, and blower 2 is provided with similar lugs, 6 and 10.

9 and 11 represent two cranks, which are pivoted at one end of the stove on pivots 12 and 13, and I usually run the pivot 12 the whole length of the stove, as it can lie back of the throat and be out of the way. Pivot 13 can also run through the stove; but I usually fasten it or journal it in the end plate. The short arms of cranks 9 and 11 are provided with teeth, as shown in Fig. 2, so that when one of said cranks is swung on its pivot the other must also move. The long arms of said cranks extend into the grooves formed on the ends of the blowers 1 and 2, as clearly shown in the drawings. On the other end of the stove are two exactly similar cranks, 4 and 5, Fig. 1, hung in the same way, and I hang crank 4 on the other end of pivot 12 when that runs through the stove. The ends of the long arms of cranks 4 and 5 lie in the grooves at the other ends of the blowers, formed by lugs 6 and 7, as shown in Fig. 1.

14 14 represent two guide-strips, which I usually place at the front edges of the stove and fit into grooves on the ends of blowers 1 and 2, to guide said blowers.

15 represents a knob or handle on one of the blowers.

In actual use a false end plate is put on each end of the stove to conceal the cranks, and it is usually curved over the front of the stove, so as to hide the ends of the blowers; but it is omitted in the drawings, to show the cranks.

The operation of my invention is as follows: When the blower 1 is lifted by knob 15, it swings the long arms of cranks 4 and 9 upward and the short arms of said cranks toward the front of the stove. The teeth on said short arms force the short arms of cranks 5 and 11 to swing in the same direction, and thus cause the long arms of said cranks to swing downward, thus carrying blower 2 down away from blower 1 and opening the front of the stove, and vice versa; and as the weight of the blowers 1 and 2 may be made nearly equal, they will counterbalance each other and remain in any desired position, and can be moved with little effort.

It is evident that the short arms of the cranks may be connected in other ways than by teeth—as by chains or pin and slot—and I do not wish to be limited to this precise form of connection.

I am aware that it is not new to connect doors by means of chains running over pulleys, so that both will move simultaneously in opposite directions, as that is shown in Letters Patent No. 147,853, to J. W. Meaker, February 24, 1874, and do not claim the same; but

What I claim as my invention, and desire to secure by Letters Patent, is—

1. In combination with the blowers 1 and 2, the pivoted cranks 4 5 and 9 11, each pair of cranks being connected with said blowers and with each other, substantially as shown and described.

2. In combination with a double blower, a pair of pivoted cranks having their long arms engaging with the two parts of the blower and their short arms movably locked together, substantially as shown and described.

HENRY P. COPE.

Witnesses:
SUMNER COLLINS,
GEO. H. LOTHROP.